US008705836B2

(12) United States Patent
Gorski et al.

(10) Patent No.: US 8,705,836 B2
(45) Date of Patent: Apr. 22, 2014

(54) SYSTEMS AND METHODS FOR RECOGNIZING INFORMATION IN OBJECTS USING A MOBILE DEVICE

(71) Applicant: A2iA S.A., Paris (FR)

(72) Inventors: Nikolai D. Gorski, St. Petersburg (RU); Andrey V. Semenov, St. Petersburg (RU); Valery Anisimov, St. Petersburg (RU); Sergey K. Maksimov, St. Petersburg (RU); Sergey N. Sashov, St. Petersburg (RU)

(73) Assignee: A2iA S.A., Paris (FR)

( * ) Notice: Subject to any disclaimer, the term of this patent is extended or adjusted under 35 U.S.C. 154(b) by 0 days.

(21) Appl. No.: 13/859,333

(22) Filed: Apr. 9, 2013

(65) Prior Publication Data

US 2014/0037184 A1 Feb. 6, 2014

Related U.S. Application Data

(63) Continuation-in-part of application No. 13/567,770, filed on Aug. 6, 2012.

(60) Provisional application No. 61/798,923, filed on Mar. 15, 2013.

(51) Int. Cl.
*G06K 9/00* (2006.01)
*G07D 7/20* (2006.01)
*G07D 11/00* (2006.01)

(52) U.S. Cl.
CPC .............. *G07D 7/20* (2013.01); *G07D 11/0066* (2013.01)
USPC .......................................... 382/138; 382/137

(58) Field of Classification Search
CPC ............................ G07D 7/20; G07D 11/0066
USPC .......... 382/137–140; 235/379; 705/39, 42, 45
See application file for complete search history.

(56) References Cited

U.S. PATENT DOCUMENTS

| | | | | |
|---|---|---|---|---|
| 6,035,064 | A * | 3/2000 | Nakao et al. | 382/200 |
| 6,064,769 | A | 5/2000 | Nakao et al. | |
| 7,253,926 | B2 | 8/2007 | Ohkawa | |
| 7,623,742 | B2 | 11/2009 | Kim et al. | |
| 2004/0061772 | A1 | 4/2004 | Yokouchi | |
| 2006/0045374 | A1 | 3/2006 | Kim et al. | |
| 2006/0182331 | A1 * | 8/2006 | Gilson et al. | 382/137 |
| 2007/0292045 | A1 * | 12/2007 | Akatsuka | 382/274 |
| 2009/0185241 | A1 * | 7/2009 | Nepomniachtchi | 358/474 |
| 2012/0230577 | A1 * | 9/2012 | Calman et al. | 382/138 |
| 2012/0250942 | A1 | 10/2012 | Boncyk et al. | |
| 2012/0263351 | A1 | 10/2012 | Boncyk et al. | |
| 2012/0321216 | A1 * | 12/2012 | Kacher et al. | 382/275 |

* cited by examiner

*Primary Examiner* — Amara Abdi
(74) *Attorney, Agent, or Firm* — Carter, DeLuca, Farrell & Schmidt, LLP

(57) ABSTRACT

The systems and methods of the present disclosure use a mobile device equipped with a camera to capture and preprocess images of objects including financial documents, financial cards, and identification cards, and to recognize information in the images of the objects. The methods include detecting quadrangles in images of an object in an image data stream generated by the camera, capturing a first image, transforming the first image, binarizing the transformed image, recognizing information in the binarized image, and determining the validity of the recognized information. The method also includes communicating with a server of a financial institution or other organization to determine the validity of the recognized information. The mobile device may include a camera, a display to display an image data stream and captured images, a memory to store a configuration file including parameters for the preprocessing and recognition functions, captured images, and software, and a communication unit to communicate with a server of the financial institution or other organization.

25 Claims, 15 Drawing Sheets

SYSTEMS AND METHODS FOR RECOGNIZING INFORMATION IN OBJECTS USING A MOBILE DEVICE

CROSS REFERENCE TO RELATED APPLICATION

This application is a continuation-in-part of U.S. patent application Ser. No. 13/567,770, filed Aug. 6, 2012, and claims the benefit of and priority to U.S. Provisional Patent Application No. 61/798,923, filed Mar. 15, 2013, the contents of both of which are incorporated herein by reference in their entireties.

BACKGROUND

1. Technical Field

The present disclosure relates to mobile banking systems. More particularly, the present disclosure relates to systems and methods for processing images of objects, including financial documents, identification cards, and credit cards and recognizing information in the processed images using a mobile device.

2. Background of Related Art

In recent years, many mobile devices incorporate built-in cameras so that users can take pictures wherever they may be located and transmit or upload them to another device such as another mobile device or a server. In addition, many mobile devices include powerful central processing units (CPUs) so that the mobile devices can perform a wide variety of functions that were traditionally done by desktop computers. As a result, mobile devices are now being used for a wide variety of applications. In particular, software applications have been developed for mobile devices to manage bank accounts, e.g., transfer money electronically.

For example, automated teller machines (ATMs) have traditionally been used to perform electronic banking transactions. In particular, many ATMs enable users to deposit financial documents. The ATMs scan the financial documents to obtain images of the financial documents. Then, the ATMs or a server in communication with the ATMs processes the images, recognize the content in the images using character or word recognition software, and performs financial transactions based on the content recognized by the software. These ATMs may also include recognition software that recognizes information in the images.

SUMMARY

Since many mobile devices now incorporate powerful CPUs and high-resolution cameras, these mobile devices can execute some of the same functions performed by personal computers and ATMs. Thus, for example, the process of depositing financial instruments or documents with a financial institution can become a more decentralized process, in which a personal mobile device is used to scan and process the financial documents rather than an ATM and/or other similar device used by financial institutions to scan and process the financial documents. Also, the process of performing financial transactions or providing identification information can be expedited or otherwise improved by using a personal mobile device to scan and process a financial card, such as a credit card, or an identification card, to obtain relevant information, rather than manually entering information on a financial card or an identification card.

The systems and methods of the present disclosure process images of an object and recognize information in the processed images by using a mobile device. In aspects, the present disclosure features a method for recognizing information in an object using a mobile device. The method includes analyzing images of the object in an image data stream generated by an image capturing device of the mobile device. The images of the object are analyzed while a user points the image capturing device at the object. The method also includes capturing a first image of the object from the image data stream. The method further includes transforming the first image to obtain a second image and binarizing the second image to obtain a binarized image. Lastly, the method includes recognizing information in the binarized image. In aspects, the method may include determining the validity of the recognized information. In aspects, analyzing images of the financial document in the image data stream includes locating and tracking a quadrangle of the financial document in the images of the image data stream. Tracking the quadrangle may be performed by tracking the edges of the object in the image data stream. The method may further include tracing the quadrangle of the object and displaying the traced quadrangle.

In aspects, the method may further include determining whether the captured first image is a color image or a grayscale image and converting the captured first image into a grayscale image if it is determined that the captured first image is a color image.

The first image may be transformed by locating a quadrangle of the object in the first image, transforming the first image so that the quadrangle of the object forms a rectangle to obtain a second image, and then removing portions of the second image that are outside of the quadrangle of the object. Alternatively, the first image may be transformed by locating a quadrangle of the object, removing portions of the first image that are outside of the quadrangle of the object to obtain a second image, and then transforming the second image so that the quadrangle of the object forms a rectangle. In aspects, transforming the second image may include performing an affine transform on the second image.

In aspects, the method may further include transforming the second image into a third image having uniform brightness and converting the third image into a binarized image.

In aspects, the method may further include performing image quality analysis on the second image to detect image defects in the second image. The image defects include one or more of a piggyback document, side or corner defects, out-of-focus, noisiness, overexposed, underexposed, under-compressed, over-compressed, and non-uniform lighting. The image defects may determine whether the second image is suitable for further processing and recognition processing.

In aspects, information in the object is recognized based on locations and/or contents of fields, which depend on the type of the object. The locations and contents of the fields may be specified in a configuration file. Recognizing information in the binarized image may include reading a configuration file that specifies predetermined filed information associated with a type of the object, locating predetermined fields in the binarized image based on the predetermined field information, and recognizing information in the predetermined fields. Alternatively, recognizing information in the binarized image may include obtaining predetermined field information associated with a type of the object through a user interface, locating predetermined fields in the binarized image based on the predetermined field information obtained through the user interface, and recognizing information in the predetermined fields.

The predetermined fields may include one or more of literal amount, numeric amount, date of issue, payer's signature, payer's name and address, payer account, payee name, bank logo, numbers, code line, check number, memo line, document type, identification number, place of issue, expiration date, and security code.

In aspects, determining the validity of recognized information may include one or more of detecting the presence of mandatory fields in the binarized image, detecting code-line and payer's signature in the binarized image, detecting a payer's address and bank logo in the binarized image, and detecting a difference between a numeric amount and a literal amount based on the recognized information. The mandatory fields may include the numeric amount, the literal amount, the date of issue, and the payee's name. Detecting a difference between a numeric amount and a literal amount may include determining a score for recognition of the numeric amount, determining a score for recognition of the literal amount, and determining an overall recognition score by comparing the score for recognition of the numeric amount and the score for recognition of the literal amount.

In aspects, the systems and methods of the present disclosure are further configured to detect defects in the object, e.g., out-of-focus images, noisy images, underexposed or overexposed images, and under-compressed or over-compressed images.

In aspects, the method may further include transmitting the recognized information and the binarized image to a server, e.g., of a financial institution, which may perform a verification process and/or a financial transaction based on the recognized information and the binarized image.

In aspects, the present disclosure features a mobile device for processing an image of an object and recognizing information in the processed image of the object. The mobile device includes an image capturing device that generates an image data stream of images of the object and captures a first image of the object. The mobile device also includes a memory coupled to the image capturing device. The memory stores the captured first image. The mobile device further includes a display unit coupled to the image capturing device. The display unit displays the image data stream and the captured image. The mobile device further includes a processor in communication with the memory and the display unit. The processor analyzes images of the object in the image data stream before the first image is captured, converts the first image into a second image, binarizes the second image to obtain a binarized image, and recognizes information in the binarized image.

The processor may analyze images of the object in the image data stream by locating and tracking a quadrangle of the object in the images of the image data stream. The processor may also trace the quadrangle of the object and the display unit may display the traced quadrangle.

The processor may analyze the first image by locating a quadrangle of the object in the first image, convert the first image by transforming the first image so that the quadrangle of the object forms a rectangle, which results in a second image, and remove portions of the second image that are outside of the quadrangle of the object.

In aspects, the present disclosure features a mobile device for remotely recognizing information in an object. The system includes an image capturing device that generates an image data stream of images of the object and captures a first image from the image data stream. The system also includes a memory coupled to the image capturing device. The memory stores the first image. The system further includes a display unit coupled to the image capturing device. The display unit displays the image data stream and the first image. The system further includes a processor coupled to the memory and the display unit. The processor analyzes images of the object in the image data stream prior to capturing the first image, normalizes the first image to obtain a normalized image, and recognizes information in the normalized image. The system further includes a communication unit coupled to the processor and the memory. The communication unit transmits the normalized image and the recognized information to a server of a financial institution or other person requesting financial or identification information to further process the normalized image and the recognized information.

In aspects, the image capturing device may be a mobile camera built into the mobile device or an external image capturing device in communication with the mobile device.

BRIEF DESCRIPTION OF THE DRAWINGS

Various embodiments of the present disclosure are described with reference to the accompanying drawings wherein.

DETAILED DESCRIPTION

The systems and methods of the present disclosure enable users to use mobile devices to extract financial information, identification information, and other useful information in order to quickly and easily perform transactions, e.g., deposit a financial document with a financial institution, or gain access to information on objects. A mobile device captures an image of an object using a built-in image capturing device or uses a stored image of the object or an image provided by an external device. The mobile device then preprocesses the image, which involves normalizing the image of the object to present it in a form suitable for recognition and performing image quality analysis (IQA) to detect image defects.

Before performing character or word recognition, the mobile device locates information fields to be recognized. In the case of checks, these information fields include courtesy amount, legal amount, date of issue, payer's signature, payer name and address, payer account, payee name, check number, code line, memo line. In the case of credit cards, these information fields include credit card number and security code. Then, the mobile device recognizes information in the located information fields and presents the recognition results in text form. The mobile device performs image usability and validity analysis (IUA) on the recognition result including, for example, detecting the absence of handwritten and typewritten information in the mandatory fields of the object. The mobile device may also perform payment document classification or detect the document type. Then, the mobile device transmits the preprocessed image and the recognition results to local memory of the mobile device or to a financial institution, which may verify the recognition results and perform financial transactions based on the recognition results.

To more accurately and efficiently recognize information in an object, the systems and methods of the present disclosure interact with both the continuous image data stream from the image sensor while pointing the camera of the mobile device and the image data captured by the camera after pressing the shutter release button of the mobile device.

Figure 1A:
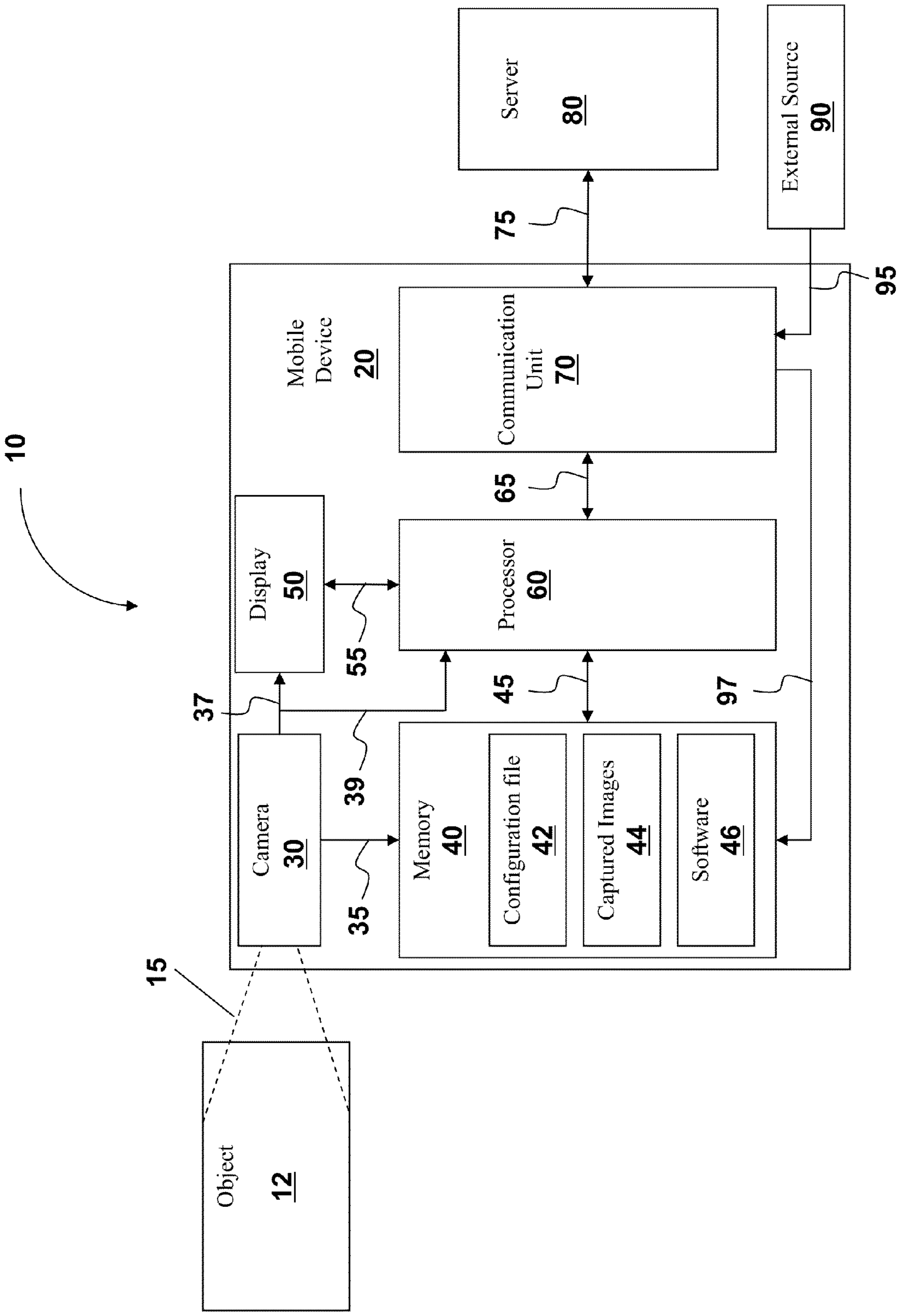
FIG. 1A is a block diagram of a mobile banking system in accordance with embodiments of the present disclosure.

FIG. 1A is a block diagram of a system 10 for processing an object using a mobile device in accordance with embodiments of the present disclosure. The system 10 includes an object 12, a mobile device 20, and a server 80. In some embodiments, the system 10 further includes an external source 90, which may provide an image of an object and/or a configuration file to the mobile device 20.

The object 12 is any formalized document for performing a financial transaction, such as personal or business bank checks, money orders, traveler's checks, giros, deposit slips, U.S. preauthorized drafts, bank drafts, and U.S. saving bonds, or any identification document, such as identification cards, driver licenses, or passports. The object 12 may be issued in any country including, for example, the USA, Canada, France, United Kingdom, Ireland, Belgium, Italy, Netherlands, Greece, Portugal, Brazil, Columbia, Chile, Mexico, Malaysia, Thailand, Singapore, Hong Kong, or Australia. The object 12 may also be issued from any financial institution including a bank or a credit union, or any other organization.

The mobile device includes a camera 30 or other similar image capturing device, a memory 40, a display 50, a processor 60, and a communication unit 70. The camera 30 captures an image of the object 12 and sends the image to the memory 40 via signal line 35. The memory 40 then saves the image with the captured images 44. The camera 30 also sends the image to the display 50, which displays the image via signal line 37.

The mobile device may be any suitable portable, handheld computing device such as a mobile phone, a smartphone, a personal digital assistant (PDA), a portable media player, or a tablet computer. The memory 40 may be any suitable memory such as internal memory, external memory, or a combination of internal and external memory. The internal memory may include flash memory. The external memory may include one or more of a SIM card, an SD card, an MMC card, a CF card, and a memory stick.

The camera's image sensor provides a real-time image data stream of the images of the object 12 while the user points the mobile camera at the object and focuses the camera before a user operates the camera to capture an image of the object, e.g., the user presses a shutter release button. Before an image is captured, the camera sends the image data stream to both the display 50 via signal line 37 and the processor 60 via signal line 39.

Figure 3:
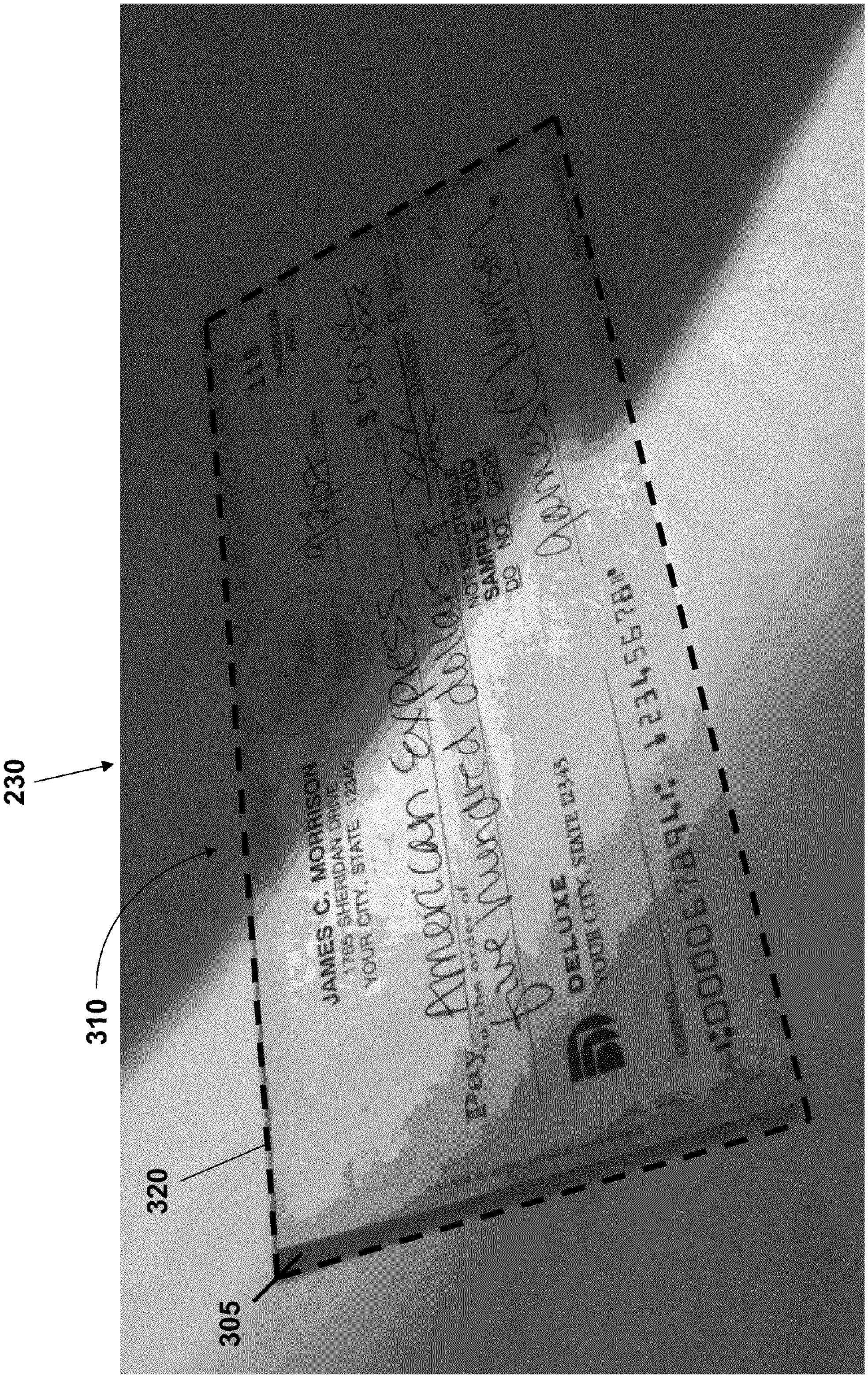
FIG. 3 is an illustration of an image of an object that may be processed by the system of FIG. 1B.

In embodiments, when the camera 30 provides the real-time image data stream to the processor 60 via signal line 39, the processor 60 analyzes the real-time image data stream from the camera 30 to determine and track the edges of the financial document 12 in the images of the real-time image data stream. The processor 60 may trace or otherwise highlight the edges of the financial document 12 in the images of the real-time image data stream on the display 50 (e.g., trace the edges of the financial document with a dashed black line 320 as shown in FIG. 3).

The memory 40 stores a configuration file 42, the captured images 44, and software 46. The processor 60 of the mobile device 20 reads the configuration file 42 in the memory 40 and adjusts the settings of the mobile device 20 based on the configuration file 42 that corresponds to the type of the financial document 12.

In some embodiments, the processor 60 recognizes the type of the financial document 12 by reading the configuration file 42, which explicitly specifies the type of the financial document 12. For example, the configuration file 42 may specify that the financial document 12 to be recognized is a money order. The configuration file 42 may be selected by the user via a graphical user interface that presents a list of different types of financial documents and prompts the user to select one of the listed types of financial documents. Examples of configuration files are described in the appendices to U.S. application Ser. No. 13/567,770, which are incorporated herein by reference in their entirety." " " "

In other embodiments, the processor 60 performs an auto-detection routine, which may be defined by program instructions in the software 46 that detects the type of the financial document 12. The auto-detection routine may be performed after preprocessing of an image of a financial document 12 and before character or word recognition. The configuration file 42 may specify whether or not the processor 60 should perform the auto-detection routine.

The configuration file 42 may include check information such as a numeric amount, a literal amount, a date of issue, payer signature, payer's name and address, payer account, payee's name, check number, memo line, and their corresponding locations in the case where the object 12 is a financial document such as a personal check. The configuration file 42 may include a card number, cardholder's name, expiration date, and security code (e.g., on the back side of a credit card) in the case where the object 12 is a financial card such as a debit card, credit card, or bank card. In the case where the object 12 is an identification document, such as a driver license, the configuration file may include license holder's name, issued date, expiration date, license number, issuing agency, and indication of organ donation. The configuration file 42 can be retrieved from the server 80 or the external source 90, e.g., a computer system of a certified financial institution, a bank, an email, a website, or a portable recording medium.

The camera 30 captures an image of an object and the memory 40 stores the captured image. As described in more detail below, the processor 60 then preprocesses the captured image of the object 12 and recognizes information contained in the preprocessed image of the object 12.

The processor 60 executes software 46 stored in the memory 40 to analyze an image data stream, capture an image, preprocess the captured image, and recognize information in the preprocessed image. The communication unit 70 receives the preprocessed image and the recognized information and transmits it to the server 80 through a wired or wireless connection 75. The server 80 may archive the preprocessed image and the recognized information, further process the preprocessed image, verify the recognized information, and/or perform financial transactions based on the recognized information.

In embodiments, the captured images of an object may be retrieved from the external source 90 through a wired or wireless connection 195. In this case, the communication unit 70 retrieves the captured image from the external source and transmits the captured image to the memory 40. Then, the processor 60 executes the software 46 stored in the memory 40 to process the captured image and recognize information in the processed image.

Figure 1B:
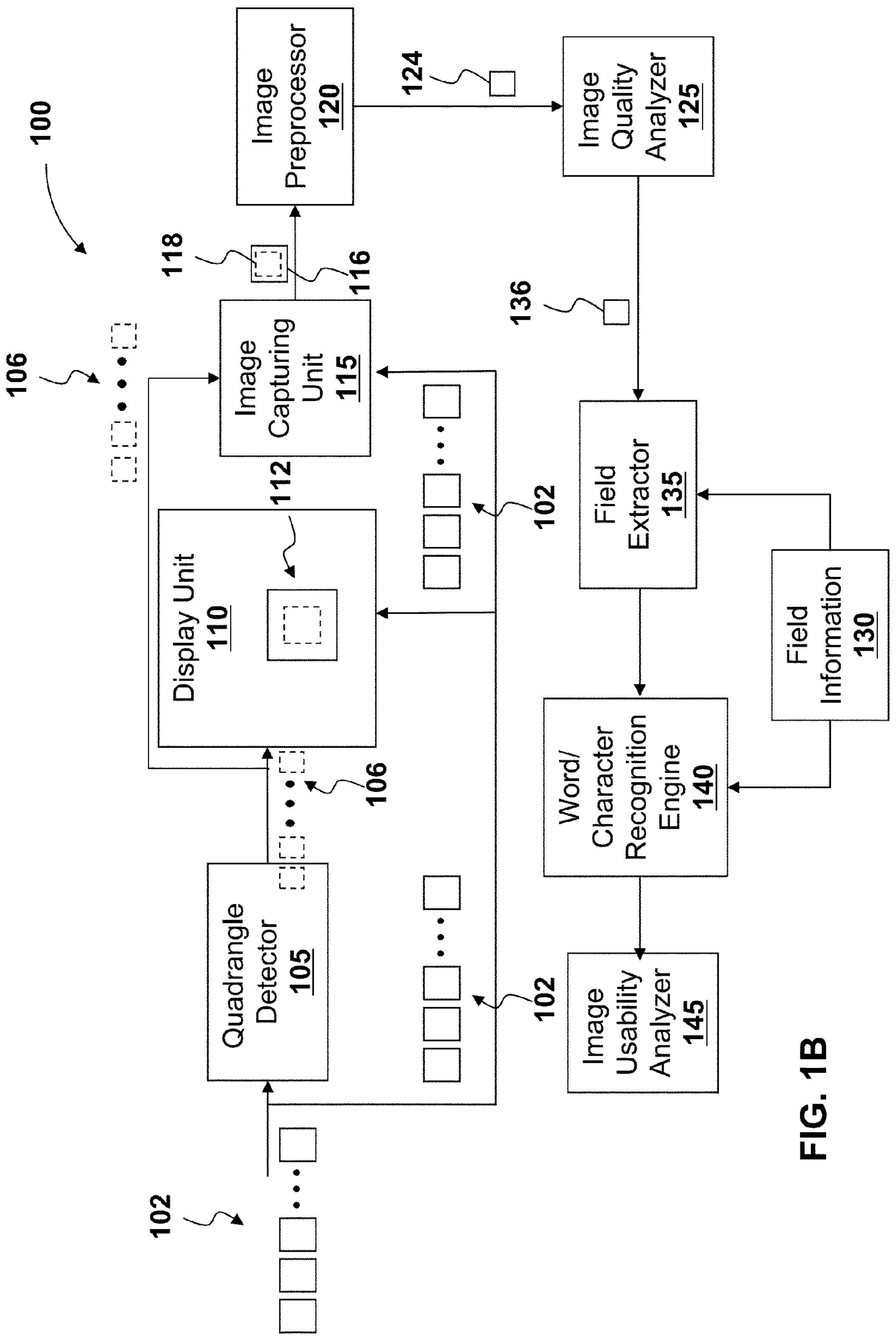
FIG. 1B is a functional block diagram of a system for performing word or character recognition of an object by the mobile device of FIG. 1A.

FIG. 1B is a functional block diagram of a system 100 for recognizing information contained in images of objects, which is implemented on the mobile device 20 of FIG. 1A. The recognition system 100 includes a quadrangle detector 105, a display unit 110, an image capturing unit 115, an image quality analyzer 120, an image preprocessor 125, a field information storage unit 130, a field extractor 135, a word and/or character recognition engine 140, and an image usability analyzer 145. All or a portion of the components of the recognition system 100 may be implemented in software 46 that is stored in memory 40 and is executable by a processor 60 of the mobile device 200. In some embodiments, all or a portion of the recognition system 100 may be implemented in firmware and/or hardware, e.g., a field-programmable gate array (FPGA), an application-specific integrated circuit (ASIC), digital circuitry, and/or analog circuitry.

The quadrangle detector 105 receives an image data stream 102 from an image sensor of the camera 30. The quadrangle detector 105 detects quadrangles in each of the images in the image data stream 106 and outputs detected quadrangles 106 for each of the images of the image data stream 102.

The display unit 110 receives both the image data stream 102 and the detected quadrangles 106, and sequentially and seamlessly displays the images of the image data stream 102 and a representation of the detected quadrangles 106 in the images on the display window 112 of the mobile device 20. The detected quadrangles 106 may be represented by drawing a dashed, highlighted, or colored line around the detected quadrangles 106 on the display window 112 of the mobile device 20.

When a user presses a shutter release button to capture an image, an image 116 of the image data stream 102 is captured by the image capturing unit 115 along with the detected quadrangle 118 that corresponds to the captured image 116. The captured image 116 and the corresponding detected quadrangle 118 may then be stored in the memory 40 of the mobile device 20.

If a user selects an appropriate button, e.g., a “Preprocess” button, the captured image 116 is provided to the image preprocessor 120. The button may be a physical button or an icon on a touch screen display of the mobile device 20. The image preprocessor 120 performs image processing on the raw captured image 116 to obtain a normalized image of the object, where the body of the object forms a rectangular shape that occupies the entire image, the image of the object is binarized, and all information fields that are readable in the capture image 116 remain readable in the preprocessed image 124.

As described in more detail below, the image preprocessor 120 may perform one or more of the following functions: (a) locating the body of the object in the captured image 116 (a first image), (b) performing a transform on the captured image 116 so that the edges of the object form a rectangle and to correct other distortions, (c) cutting or trimming off those portions of the transformed image that are outside of the edges of the object, e.g., outside of the detected quadrangle 118, resulting in a second image, (d) if the second image is a color image, converting the second image into a third, grayscale image, (e) transforming the brightness and contrast of the second or third image so that the lighting is uniform across the body of the object, and (f) binarizing the second or third image, e.g., by performing a binarization or thresholding algorithm on the second or third image.

After the captured image 116 has been preprocessed, the preprocessed image 124 is provided to the image quality analyzer 125, which performs image quality analysis on the preprocessed image 124. If the image quality analyzer 125 determines that the preprocessed image 124 has a predetermined level of quality suitable for recognition, the preprocessed image 124 is provided to the field extractor 135. The predetermined level of quality may be defined by quality control parameters for the preprocessed image 124 and/or the color or grayscale image that is generated by the image preprocessor 120. The image quality analyzer 125 may perform image quality analysis on the preprocessed image 124 if the object shown in the preprocessed image 124 has a rectangular form and the object occupies the entire space or approximately the entire space of the preprocessed image 124.

In some embodiments, the analyzed image 136 may be provided to the field extractor 135 if the user selects an appropriate button, e.g., a “Recognition” button. The field extractor 135 extracts fields of the analyzed image 136 based on field information 130 stored in memory. The fields are targeted regions in the image of the object 12 containing handwritten or typewritten words, characters, or numbers to be recognized by the word or character recognition engine 140. The field information 130 may include the location and dimensions of the field and a type of the contents within the field (e.g., a character, numeric value, typewritten, handwritten, or mixed type).

The extracted field images are then passed to the word or character recognition engine 140, which recognizes the words or characters within the extracted field images based on the field information 130. The recognized words or characters are then provided to the image usability analyzer 145. The image usability analyzer 145 determines whether the recognized words or characters are valid. For example, in the case where the object 12 is a check, the image usability analyzer 145 determines whether the numeric and literal amounts are consistent with each other. The image usability analyzer 145 may determine whether a check is a valid check, e.g., determine whether the check is a counterfeit check.

Figure 2A:
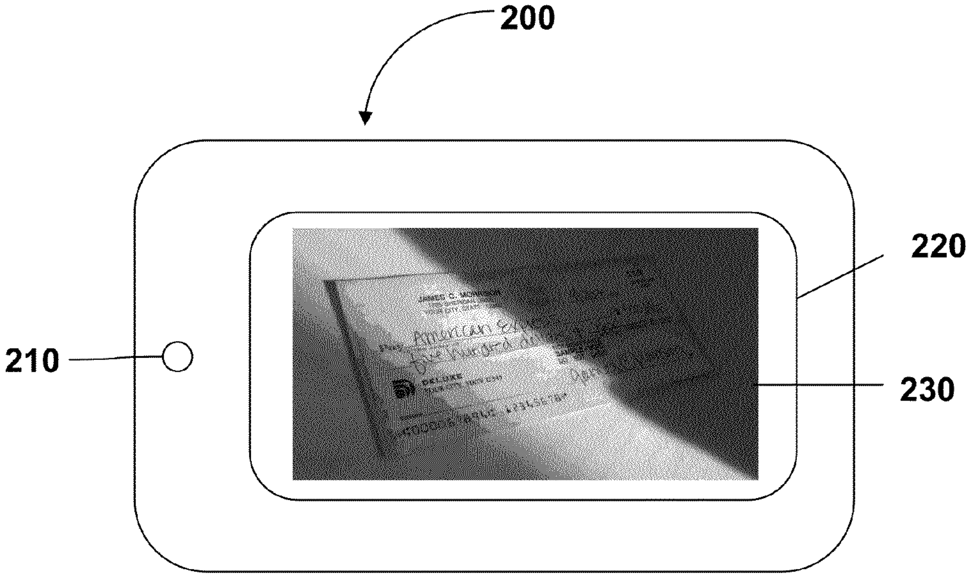
FIG. 2A is a schematic diagram of a mobile device capturing an image of a financial document in accordance with an embodiment of the present disclosure.
Figure 2B:
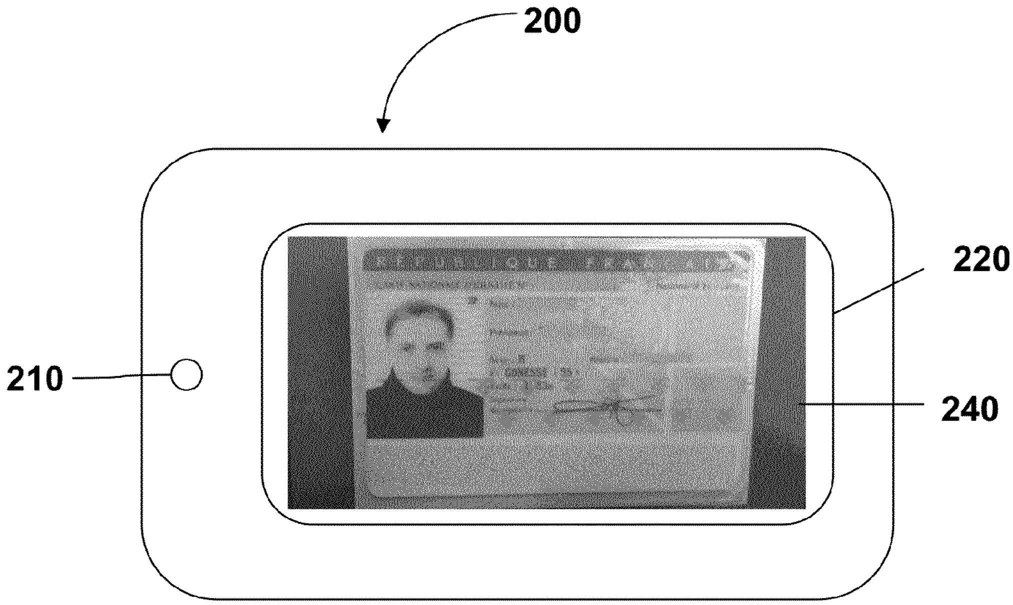
FIG. 2B is a schematic diagram of a mobile device capturing an image of an identification document in accordance with another embodiment of the present disclosure.
Figure 2C:
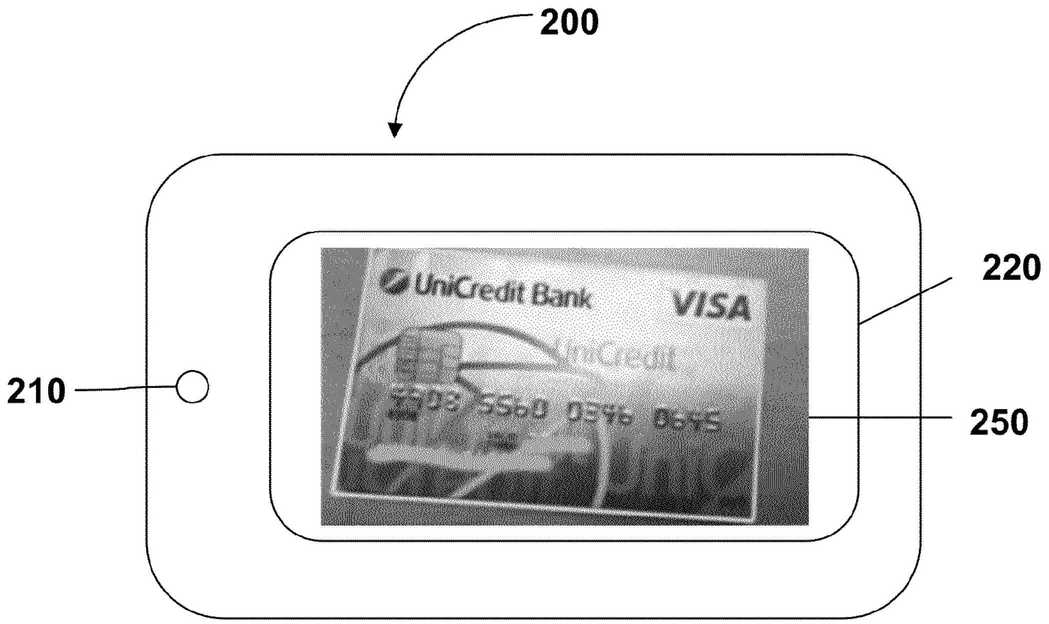
FIG. 2C is a schematic diagram of a mobile device capturing an image of a financial card in accordance with yet another embodiment of the present disclosure.

FIGS. 2A-2C illustrate a mobile device 200 that captures an image of a personal check 230, an identification document 240, or a credit card 250, respectively. The mobile device 200 may be a digital camera, a tablet personal computer (PC), a personal digital assistant (PDA), a smart phone, a hand-held device which has a camera that can take pictures, or a web camera. The mobile device 200 includes a camera 210 and a display 220. The camera 210 may be disposed in the back side and/or the front side of the mobile device 200. The mobile device 200 may also include a physical switch that causes the camera 210 to capture an image of an object. Alternatively or additionally, if the display 220 is a touch screen monitor, the switch may be a selectable icon or button (e.g., the button 630 of FIG. 6A) in a graphical user interface that is displayed on the display 220.

The mobile device 200 saves captured images of an object in the memory of the mobile device 200 as an image data file in one of the standard formats including .jpg, .tiff, .bmp, or .gif. The data file can contain a color (R+G+B color planes, 8 bits or more per pixel), grayscale (8 bits per pixel), or binarized (1 bit per pixel) image of the object. The mobile device 200 may also receive image data files containing captured images via the Internet, an intranet, a multimedia messaging service (MMS), an Internet relay chat (IRC), or internet messaging (IM).

The display 220 displays a captured image of the personal check 230, the identification document 240, or the credit card 250. The display 220 can also display an image data stream including real-time images of an object received from the camera 210 before the camera 210 captures an image. The display 220 may be a touch screen monitor.

A processor in the mobile device 200 preprocesses the image 230 to make the image 230 recognizable by a character or word recognition engine, e.g., an optical character recognition (OCR) engine or an intelligent word recognition (IWR) engine.

FIG. 3 illustrates an image 230 of a personal check 310. The image 230 includes distortions in the personal check 310, which may adversely affect the character or word recognition process. One of the distortions is the non-rectangular shape of the personal check 310 in the image 300. This occurs because the plane of the image sensor in the camera of the mobile device may not be parallel to the plane of the personal check 310 that is being photographed. As a result, the systems and methods of the present disclosure locate the personal check 310 in the image not as a rectangle, but as a quadrangle 320.

In embodiments, the quadrangle detector 105 of FIG. 1B locates and continuously traces edges of the quadrangle of the personal check 310 during the pointing and focusing of the camera before the shutter release button of the camera is pressed or otherwise actuated by the user. The quadrangle detector 105 may locate the quadrangle by locating edges of the personal check 310. After the shutter release button is pressed and the image of the personal check 310 is captured by the image capturing unit 115, the located quadrangle is transformed into rectangular form by the image preprocessor 120.

Another distortion is the non-uniform lighting of the personal check 310. As shown in FIG. 3, a left portion of the personal check 310 is brighter than the other portions of the personal check 310. The quadrangle 320 may also include a shadow portion 305 created by the angle of the light that illuminates the personal check 310. The shadow portion, however, may not disturb the recognition process. In embodiments, the image preprocessor 120 filters the captured check image using a lighting compensation algorithm to make the lighting of the personal check 310 uniform. The lighting compensation algorithm is efficient and allows for the replacement of the binarization algorithm by a simple thresholding algorithm.

In general, the spatial frequencies of the non-uniform lighting (the "noise" part) are essentially lower than the spatial frequencies of the document itself and the textual information fields from the document (the "signal part"). Thus, low-frequency noise may be removed from a captured image by computing a local average and then subtracting the local average from the captured image. However, because the captured image is the product of the signal part and the noise part (i.e., captured image=signal part×noise part), low-frequency noise may be removed in the logarithmic space (and not in the initial space). This may be accomplished by filtering the captured image according to the lighting compensation algorithm, which may take the logarithm of the captured image, remove low-frequency noise by subtracting the local average from the logarithm of the captured image, and convert the logarithm of the captured image back into the non-logarithmic space by taking the exponent of the logarithm of the captured image. This lighting compensation algorithm may be described by the following formula: $I1=\exp(\log(I(x,y))-\text{Average}(\log(I(x,y))))$, where $I(x,y)$ is the captured image at point (x,y), I1 is the filtered image at point (x,y), and Average( ) is a local averaging operator. The local averaging operator may perform the convolution of the captured image with a bell-like kernel.

After the captured image is filtered using the lighting compensation algorithm, the filtered image may be binarized by performing a simple thresholding algorithm. The thresholding algorithm may involve comparing the brightness of each of the points of the filtered image to a predetermined threshold, and generating a binary image having: (1) points with an image brightness value of 0 if the brightness of the corresponding points in the captured image is less than the predetermined threshold and (2) points with an image brightness value of 1 if the brightness of the corresponding points in the captured image is not less than the predetermined threshold. This thresholding algorithm may be described by the following formula: If $(I1(x,y)<T)$, then $I2(x,y)=0$, otherwise $I2(x,y)=1$, where $I1(x,y)$ is the filtered image at point (x,y) and $I2(x,y)$ is the binary image containing only two values of image brightness 0 and 1 at point (x,y).

The image preprocessor 120 may correct other distortions in the image of an object including an object that occupies only a portion of the captured image, an object that includes projective distortions, or a portion of the object is out-of-focus.

Figure 4:
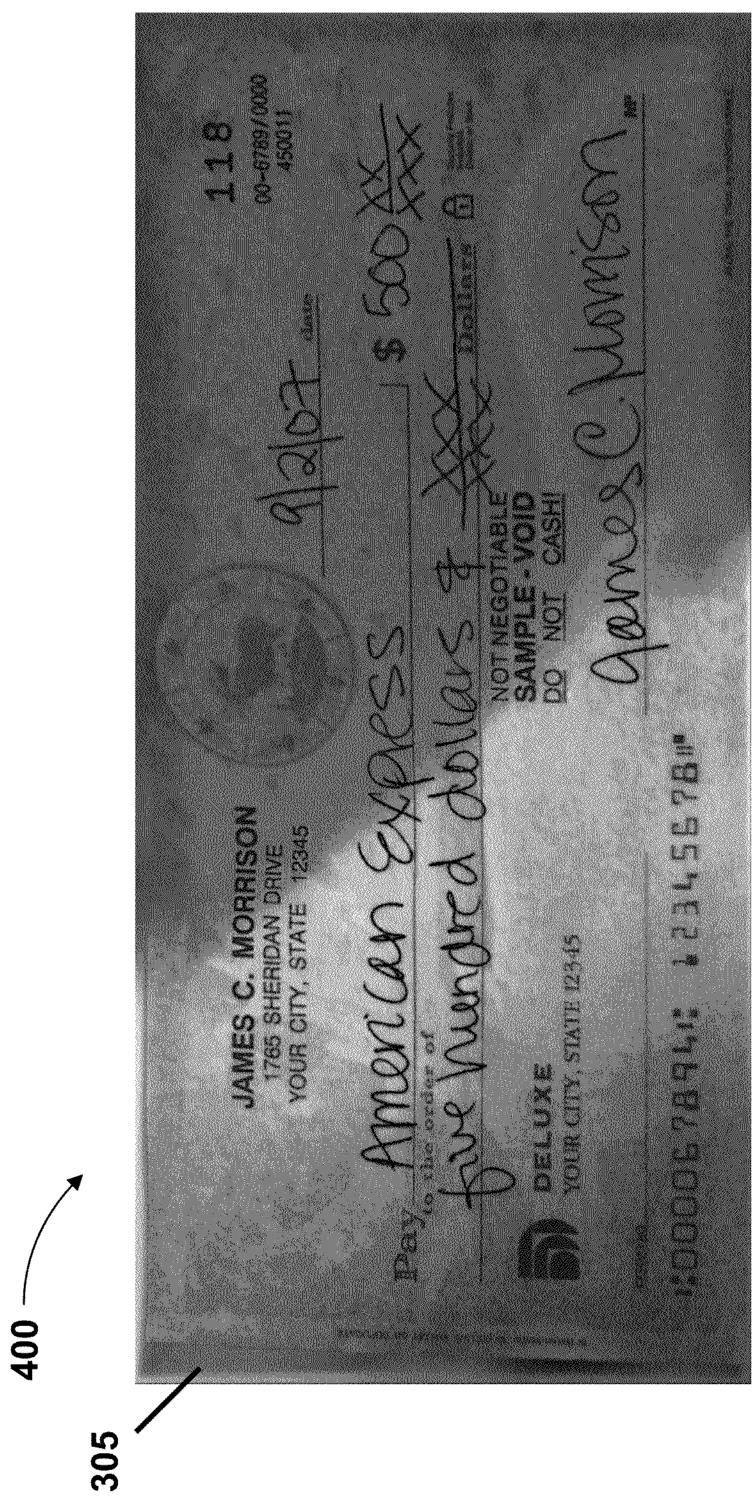
FIG. 4 is an illustration of the image of the object of FIG. 3 that has been processed by the image preprocessor of FIG. 1B.

As described above, the image preprocessor 120, among other things, extracts the image of the object from the captured image. FIG. 4 illustrates a check image 400 that has been extracted from the captured image 230 of FIGS. 2A and 3. The image preprocessor 120 preprocesses the captured image 230 to obtain a normalized image that is suitable to be recognized by the character or word recognition engine (e.g., OCR or IWR engines).

The preprocessing includes transforming the shape of the check image 310 into a rectangular or nearly-rectangular shape. To transform the check image 310, the mobile device 200 locates edges of the check within the image 230, removes portions of the image 230 that are outside of the edges of the check, and transforms the remaining image so that the edges of the transformed image form a rectangular shape or nearly-rectangular shape.

In embodiments, the preprocessing may employ an affine transformation, which may be a translation, a geometric contraction, an expansion, a dilation, a reflection, a rotation, a shear, a similarity transformation, a spiral similarity, or any combination thereof, to convert an irregularly-shaped check image to a rectangular-shaped check image. Other transformations may be employed based on the status of a check image in a captured image.

The preprocessing may further include transforming the check image so that the brightness and contrast of the check image is uniform. This uniform brightness eliminates unnecessary boundaries caused by different light intensities across the check image 400. The image is then converted into a binarized image.

Figure 5:
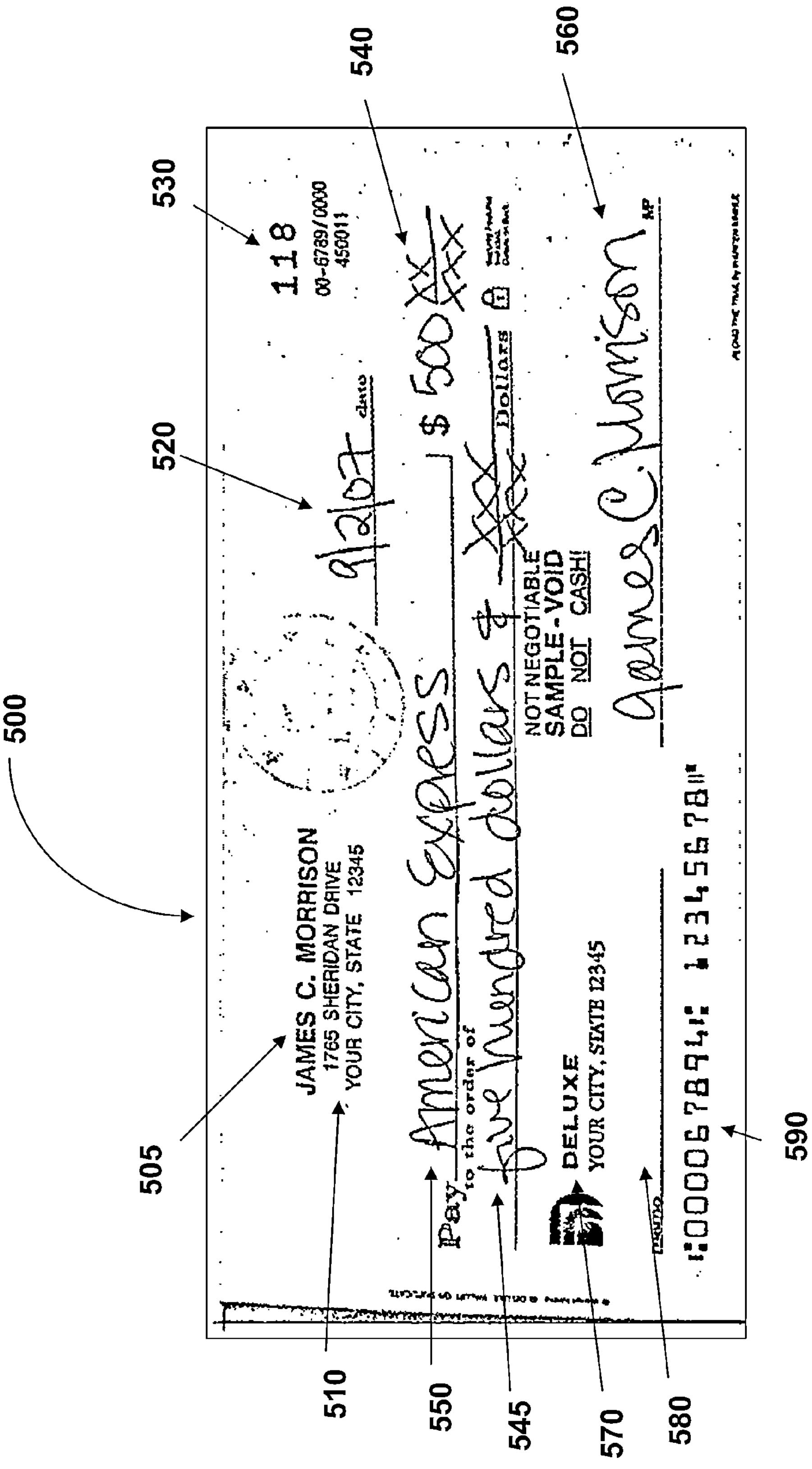
FIG. 5 is an illustration of a binarized image of the transformed image of the object of FIG. 4.

FIG. 5 illustrates a binarized image 500 after the preprocessing has been performed. The binarized image 500 is used to recognize information in the personal check. The items of information to be recognized may include a payer's name 505, a payer's address 510, a date of issue 520, a check serial number 530, a numeric amount 540, a literal amount 545, a payee's name 550, a payer's signature 560, a payer's bank logo 570, a memo 580, and a code line 590, which may include a routing number and an account number. Each item of information is located at a specific location within the personal check and contains specific contents.

The configuration file 42 specifies each item of information as a field having a particular location and contents. The configuration file 42 includes field information that is specific to a type of the object that is captured within the image 500. For example, if the software 46 running on the processor 60 determines that the type of financial instrument in the captured image is a personal check, the software 146 retrieves the configuration file that contains field information for a personal check. The configuration file may include field information for other types of objects such as business bank checks, money orders, traveler's checks, giros, deposit slips, U.S. preauthorized drafts, bank drafts, and U.S. saving bonds.

Figure 6A:
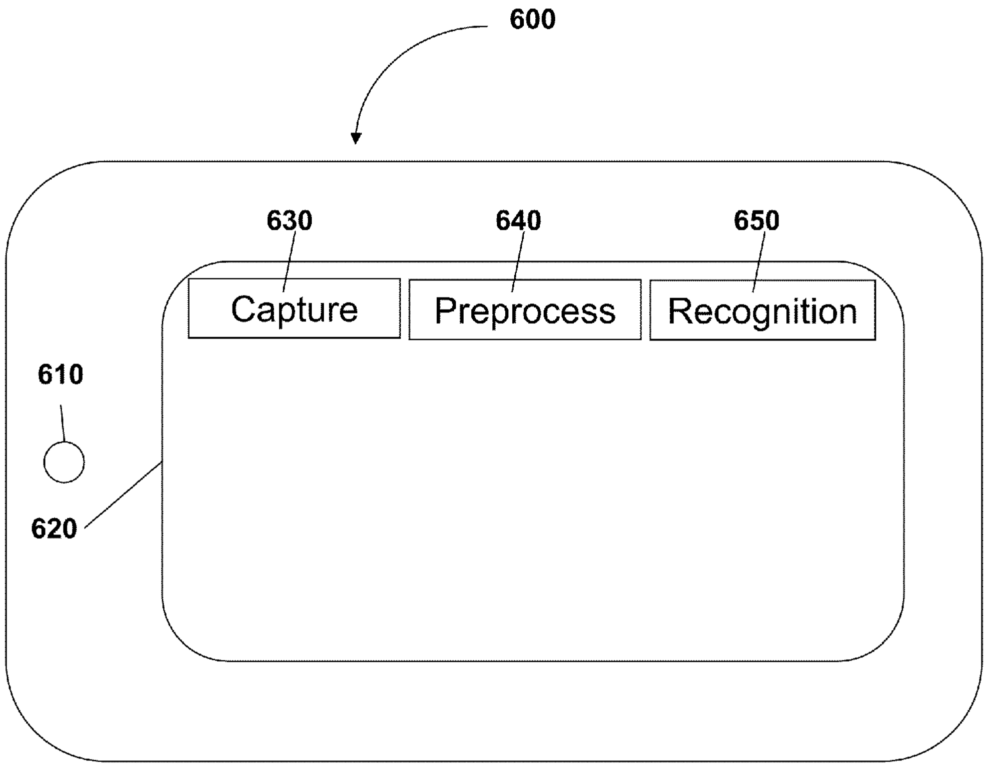
FIG. 6A is a schematic diagram of the mobile device of FIG. 1 in accordance with an embodiment of the present disclosure.

FIG. 6A illustrates a front view of a mobile device 600 having software for check recognition installed on the mobile device 600. The mobile device 600 includes a camera 610 and a touch screen monitor 620. The touch screen monitor 620 shows three buttons: the Capture button 630, the Preprocess button 640, and the Recognition button 650. In other embodiments, the mobile device 600 may include a non-touch screen monitor and physical buttons similar to the Capture button 630, the Preprocess button 640, and the Recognition button 650.

In yet other embodiments, the mobile device 600 may include more or less than three icons or buttons. The mobile device 600 may include more than three icons or buttons for additional functions such as sending recognized information to a financial institution to carry out a financial transaction or to an agency for identification purposes. Alternatively, the mobile device 600 may include less than three icons or buttons if multiple functions are controlled by a single icon or button. For example, the functionality associated the Capture button 630 and Preprocess button 650 may be combined into a single button that may be selected by the user to reduce the number of user selections by a user to perform processing of an object.

The processor 60 receives a real-time image data stream from the camera 610 and detects and tracks edges of the quadrangle of an object in the real-time image data stream. The processor 60 may also display the real-time image data stream and a line drawing of the quadrangle of the object on the monitor 620. When a user selects the Capture button 630, the camera 610 captures an image, which the processor 60 stores in the memory together with detected quadrangle information corresponding to the captured image. Detecting and tracking the quadrangle of the object in the real-time image data stream reduces the amount of preprocessing that is performed when the user presses the Preprocess button 640. The processor 60 then displays the captured image on the monitor 620 so that the user can review the captured image and decide whether to preprocess the capture image or to capture another image.

When the user selects the Preprocess button 640, the captured image is preprocessed to generate a binarized image, such as the binarized check image 500 in FIG. 5. When the user selects the Recognition button 650, the check recognition software recognizes information in the check image and verifies the validity and/or usability of the recognized information.

Figure 6B:
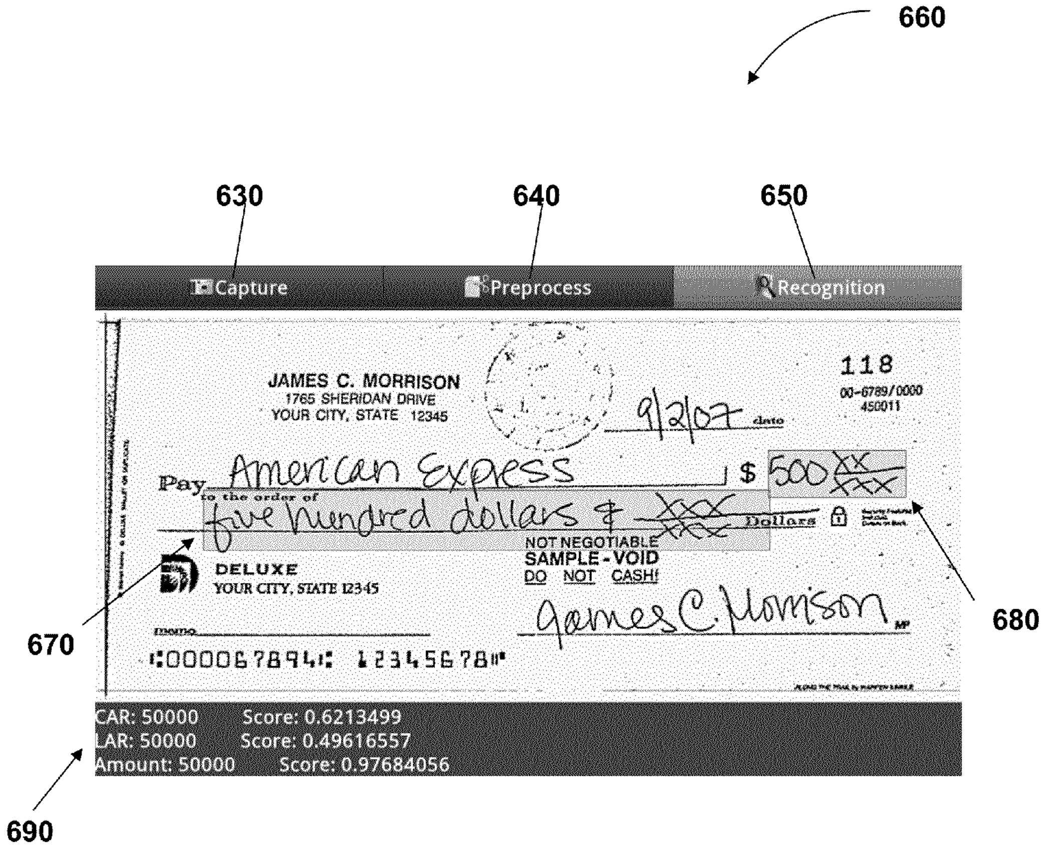
FIG. 6B is an illustration of the user interface of the mobile device of FIG. 6A in accordance with another embodiment of the present disclosure.

FIG. 6B illustrates a user interface 660 of the check recognition software when a user selects the Recognition button 650. The user interface 660 displays the binarized image of the check and highlights a literal amount field 670, a numeric amount field 680, and a listing of recognition results and corresponding scores 690.

As shown in the listing of recognition results and scores 690, the courtesy amount recognized (CAR) corresponding to the numeric amount field 680 is 50000 with a recognition score of 0.6213499. The legal amount recognized (LAR) corresponding to the literal amount field 670 is also 50000 with a recognition score of 0.49616557. These recognition scores may be determined by the check recognition software using any suitable scoring method. The recognition scores represent the reliability of the check amounts recognized in the numeric amount field 680 and in the literal amount field 670.

The last line of the listing of recognition results and scores 690 shows the final determination of the check amount, which, in this example, is 50000. The final amount may be determined by cross-correlating the recognized amounts in the numeric amount field 680 and in the literal amount field 670. As shown in this example, the recognition score for the final amount is 0.97684056. Thus, while the recognition scores of the literal amount field 670 and the numeric amount field 680 are relatively low, the combination of the recognition information from the fields 670, 680 results in a relatively high recognition score. Thus, in embodiments of the present disclosure, the recognition information from multiple fields may be used to obtain a reliable recognition result.

Figure 7:
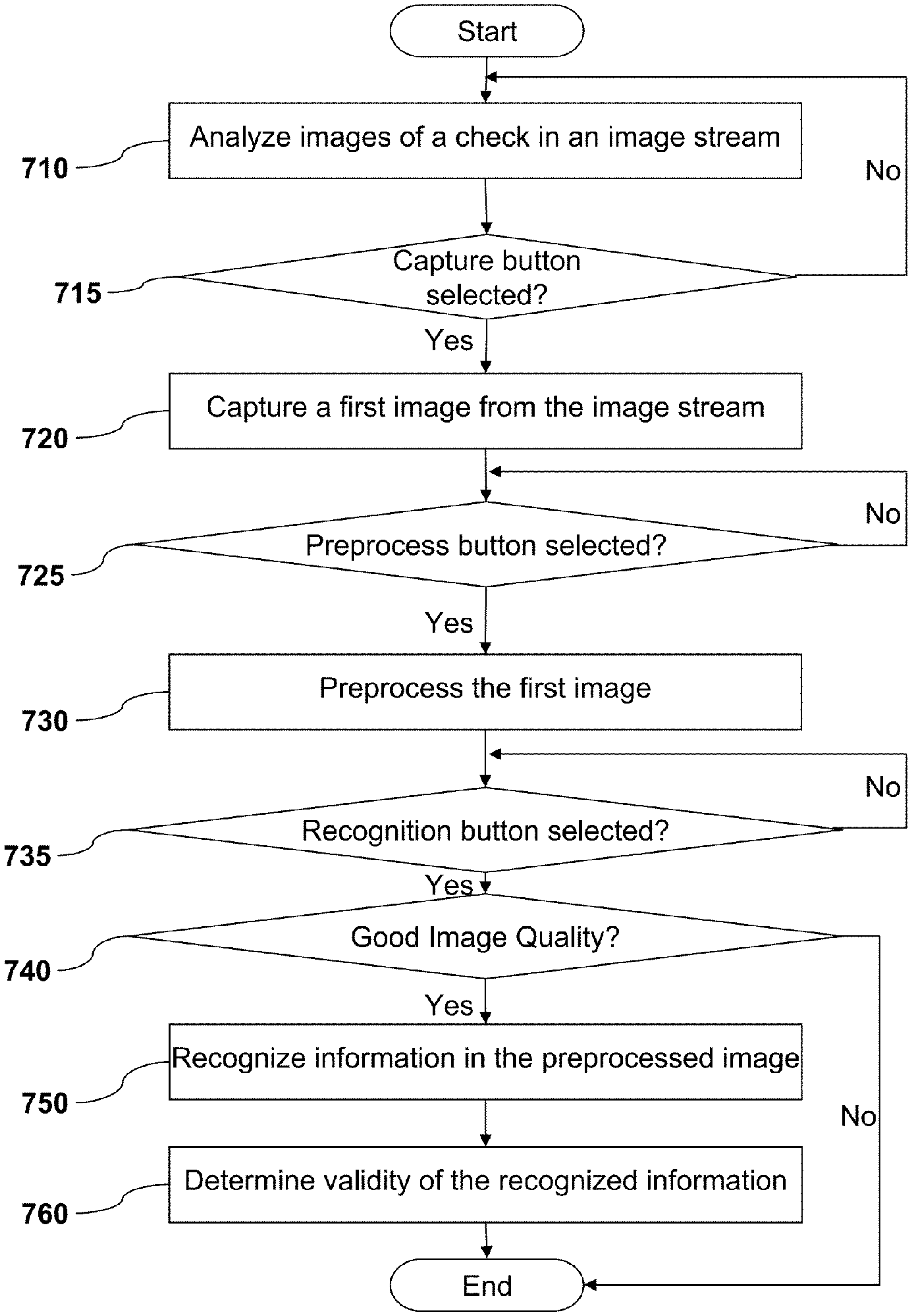
FIG. 7 is a flowchart illustrating a method of recognizing information contained in an image of an object in accordance with embodiments of the present disclosure.

FIG. 7 is a flowchart of a method of recognizing information in an object 12 (e.g., a check) by using a mobile device 20 having a camera 30 capable of capturing an image of the object 12.

In step 710, an image data stream of the check is received and analyzed to obtain edge information of a check that appears in the image data stream. In step 710, the image data stream may be displayed along with the edge information. Analyzing the image data stream as it is being received from the camera to recognize the edges of the object 12 reduces the amount of computing resources and time needed to perform the preprocessing step 720.

In step 715, it is determined whether the user has selected the button to capture an image of the object 12 such as the capture button 630 on the display of the mobile device 600 of FIG. 6A. If the button is selected, the method proceeds to step 720. In step 720, a first image is captured and stored in memory along with the edge information obtained in step 710. In some embodiments, the first image may be received from an external source, in which case the first image is analyzed to detect edges of the first image before the first image is binarized in step 730 to obtain a binarized image (e.g., the binarized image 500 in FIG. 5).

In step 725, it is determined whether preprocessing the first image is selected, meaning that the preprocess button 640 of the mobile device 600 is pressed. If preprocessing the first image is selected, then the first image is then preprocessed to obtain a binarized image in step 730. After the binarized image is generated in step 730, it is determined whether recognizing the binarized image is selected in step 735. If recognizing the binarized image is selected or the recognition button 650 of the mobile device 600 is selected, the method proceeds to step 740.

In step 740, it is determined whether the information in the preprocessed image is readable. In other words, it is determined whether the preprocessed image contains a predetermined level of quality for recognition in step 750. If the quality of the preprocessed image is lower than the predetermined level of quality, the method is ended. Otherwise, the method proceeds to step 750. Determining whether the preprocessed image is sufficiently good for recognition in step 750 may save time and increase efficiency of the image quality analysis because low quality check images may be discarded and quickly replaced by another potentially high quality check image.

In step 750, the information in the check is recognized by using a character and/or word recognition engine that is executed by the processor 60. The character recognition engine analyzes an image of characters to recognize the characters in the image. For example, the character recognition engine recognizes the payee's name 550 in FIG. 5 as a set of individual characters that make up the term "American Express." The word recognition engine analyzes an image containing a set of words to determine valid words within the image. The character recognition engine may perform optical character recognition (OCR) for recognizing characters in typewritten text and intelligent character recognition (ICR) for recognizing characters in hand-printed text. The word recognition engine may perform text and intelligent word recognition (IWR) for recognizing words in handwritten text.

The recognition engines may be configured to perform one or more recognition tasks including check amount recognition, date recognition, payer address recognition, payee name recognition (with a specified dictionary), detection of the presence of a signature, code-line recognition, RLMC (Clef de Recomposition de la Ligne Magnétique Code) recognition (France), checking whether the payer or payee name belongs to a "black" list, check number recognition, memo-line recognition (U.S.A.), bank branch's address recognition, payee address recognition, line one recognition (Brazil), account number recognition, payer name recognition, CPF-CNPJ (Cadastro de Pessoas Físicas—Cadastro Nacional Pessoa Juridica) number recognition (Brazil), BOA date recognition (Brazil), account number recognition on rear side of check (Malaysia), detection of difference between CAR and LAR, and detection of the difference between check amount and coupon amount.

After recognizing information in the check image in step 750, it is determined whether the recognized information is valid in step 760. This step may involve performing an image usability analysis (IUA). The image usability analysis determines the validity of fields in the object. The image usability analysis may include a courtesy amount (CA) field analysis, a legal amount (LA) field analysis, a signature analysis, a payee name analysis, a date field analysis, a Magnetic Ink Character Recognition (MICR) field analysis, a payer address analysis, a memo-line analysis, and/or a payer's bank logo/address analysis. The configuration file may include flags that enable/disable IUA of particular fields.

Figure 8:
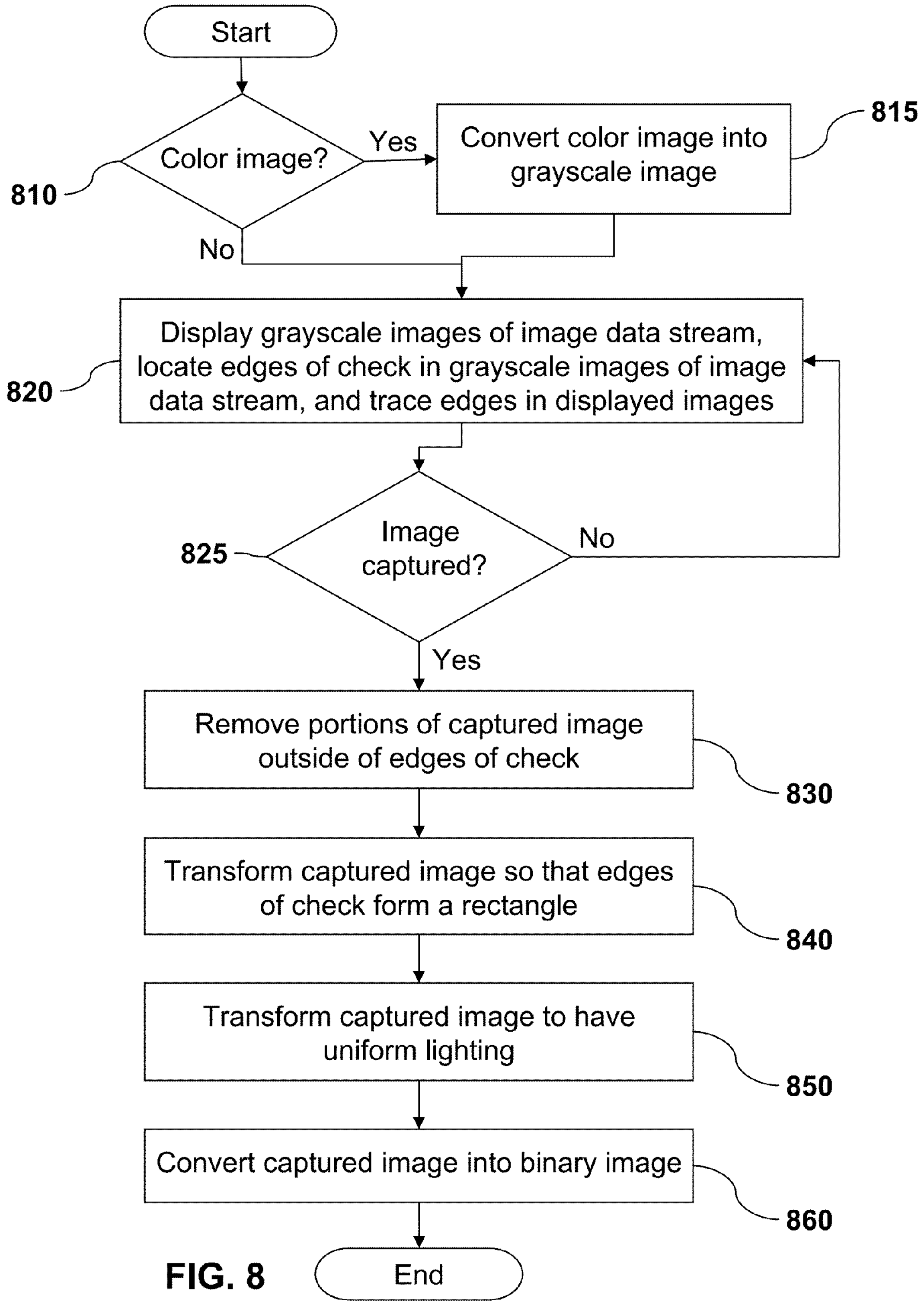
FIG. 8 is a flowchart illustrating the capturing and preprocessing steps of FIG. 7.

FIG. 8 is a flowchart illustrating steps performed by the preprocessing step 730 of FIG. 7. The preprocessing step 730 is performed before the step of recognizing information in the check image 230 of FIG. 2A. The preprocessing step 730 can also be used, for example, on an image of identification documents, such as identification cards issued by an organization or a governmental agency. In step 810, it is determined whether the image of the object in the image data stream is a color image or a grayscale image. If it is determined that the image is a color image, the image is converted into a grayscale image in step 815.

Then, in step 820, images of the image data stream are displayed on a display, the edges of the check forming a quadrangle in the images of the image data stream are located, and the edges of the check in the displayed images are traced or otherwise highlighted. In embodiments, the images of the image data stream are displayed on the display in color while the edges of the check are detected in grayscale images of the image display stream. In step 825, an image of the check is captured. In some embodiments, it is determined whether the image is captured from a real-time image data stream generated by the camera in the mobile device or is received from an external source (e.g., an email, MMS, IM, or a scanner). If the image of the check is captured from the image data stream, the process proceeds to step 830 because the edge detection information corresponding to the captured image already exists because edge detection is performed on the images in the image data stream generated by the camera as described above with reference to FIG. 6. On the other hand, if the image of the check is received from an external source, then edge detection is performed on the image of the check before proceeding to step 830.

Because the optical axis of the camera may not be aligned with and perpendicular to the center of the object being imaged (in other words, the plane of the camera sensor may not be parallel to the plane of the check), the edges of the object in the captured image may form a quadrangle with opposite sides that are not parallel to each other and/or that have unequal lengths. Thus, in step 830, a non-rectangular shape of the image of the check is transformed into a rectangular shape. Step 830 may involve translating, rotating, expanding, contracting, and/or reflecting the image of the check. Step 830 may involve applying an affine transformation to the image of the check. The affine transformation preserves collinearity (i.e., all points on a line lie on a line after the transformation) and the ratio of distances (i.e., a midpoint of a line segment remains as the midpoint of a line segment after transformation).

In step 830, portions of the captured image outside of the quadrangles of the check are removed. In other words, the check image is extracted from the captured image. It is then determined whether the remaining portions of the captured image form a rectangle. If it is determined that the remaining portions of the captured image do not form a rectangle, step 840 is performed. Otherwise, the process proceeds to step 850. In step 840, geometric transformations, which may include a translation, a geometric contraction, an expansion, a dilation, a reflection, a rotation, a shear, a similarity transformation, a spiral similarity, or any combination, are used to transform a quadrangle shape of the remaining portions of the captured image to a rectangular shape.

In embodiments, steps 830 and 840 are interchangeable. In other words, geometrically transforming the captured image so that the quadrangle shape of the check forms a rectangle is performed first while removing portions of the transformed image outside of the check is performed second. Performing steps 830 and 840 in any order gives a substantially rectangular shape of the check image to the next step 850.

In step 850, the geometrically-transformed image is transformed so that it has uniform lighting. Then, in step 860, the transformed image having uniform lighting is transformed into a binarized image, which has 1 bit/pixel or only black and white colors. An example of the binarized image is shown in FIG. 5. After the binarized image is generated, the preprocessing of the captured document ends.

Figure 9:
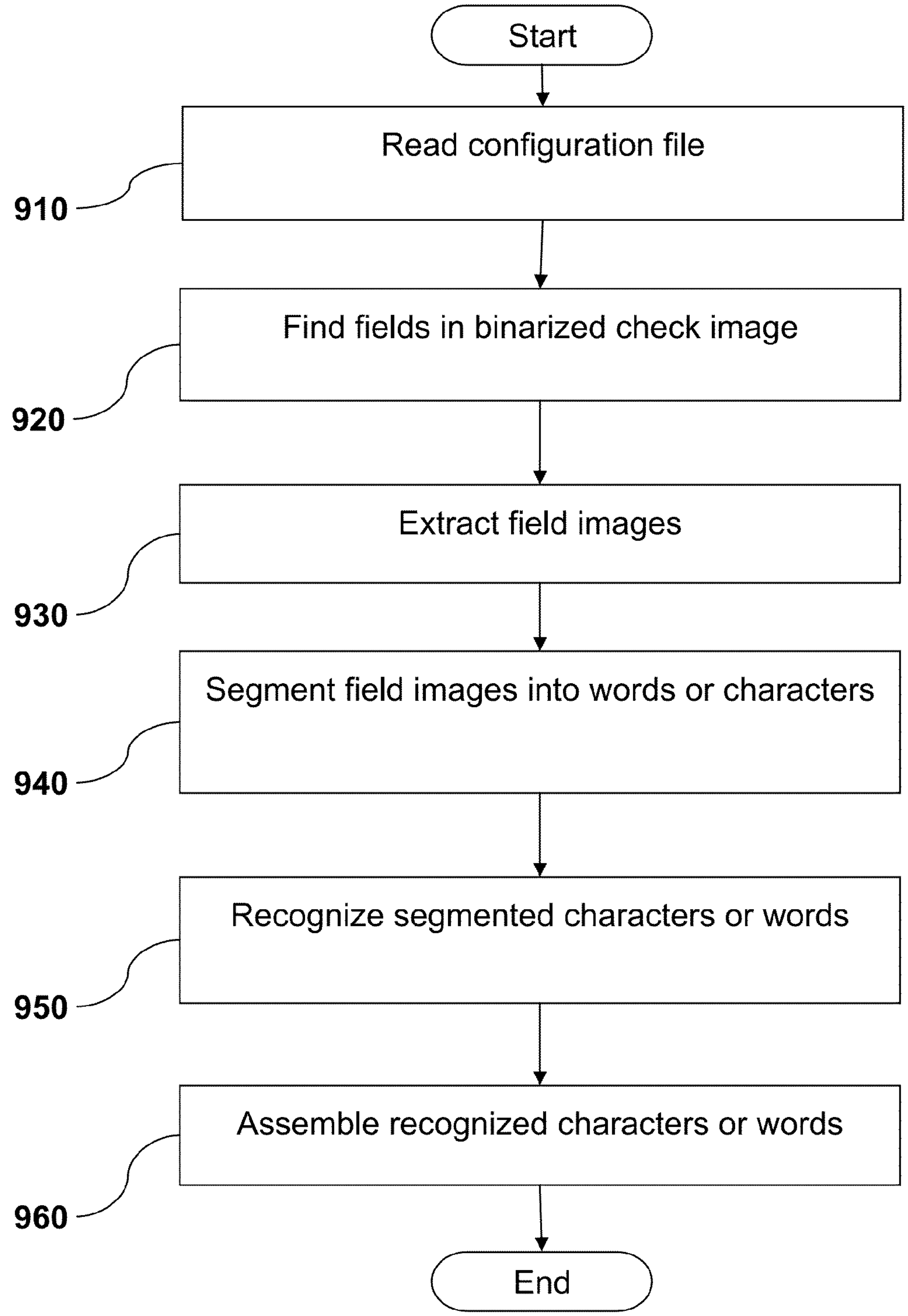
FIG. 9 is a flowchart illustrating the recognizing step of FIG. 7.

FIG. 9 is a flowchart illustrating the step of recognizing information in a binarized image of the check (i.e., step 740 of FIG. 7). After the recognition process is initiated in step 735, e.g., when a user selects the recognition icon or button, a configuration file is read from memory in step 910. As described above, the configuration file specifies field information corresponding to the type of the object within the captured image. The field information may include the dimensions and location of fields and the type of contents within the fields.

The configuration file may include different field information for any type of financial documents and identification documents. For example, the configuration file may contain field information for business bank checks, money orders, traveler's checks, giros, deposit slips, U.S. preauthorized drafts, bank drafts, U.S. saving bonds, credit cards, bank cards, gift cards, debit cards, cash cards, identification cards issued by agencies of different countries, passports, driver's licenses, and any identifying documents. Further, the configuration file may contain field information for any foreign country including, for example, France, Brazil, England, Europe, United Kingdom, Ireland, Canada, Australia, Hong-Kong, Portugal, Mexico, Thailand, Chile, Germany, New Caledonia, Netherlands, Belgium, Malaisia, and Peru. In embodiments, the systems and methods of the present disclosure may determine the type of the object that is captured and read the field information from the configuration file that is relevant to the type of the object. For example, if it is determined that a French business bank check is captured, field information that is relevant to this type of check is read from the configuration file and used in the recognition process.

In step 920, fields in the binarized image are found based on the field information in the configuration file. The fields may be found in the binarized image by one or more of the following methods: (1) finding the field based on a location (e.g., coordinates in the image) that is specified in the configuration file, (2) finding the field by locating associated keywords, and (3) finding the field by locating associated key-objects. A field specified in the configuration file may specify a location of the field and the type of contents within the filed. For example, the configuration file may specify a field that is located in an upper right corner of the check and that contains a serial number.

The keywords (e.g., "Pay," "Dollars," or "Date"), which are printed on the check, may also be used to locate fields in the check image. For example, the keyword "Date" may be used to locate the date field in the check image or the keyword "Pay to the order of" may be used to locate the name of the payee. Similarly, key objects may include key symbols such as currency signs (e.g., $ (dollar), € (euro), ¥ (yen), ₩ (won), £ (pound)), which may be used to locate the numeric amount field in the check image, a rectangular box, which may be additionally or alternatively used to locate the numeric amount field in the check image, and the symbol ⑆, which may be used to locate the field for the code line in the check image. The keywords may be different when the object being imaged is a credit card or a driver license. In the case of credit cards, keywords may include "Good Thru" and, in the case of driver licenses issued by a state in the United States, the keywords may include "Sex," "Eyes," "ID," "DOB," "Issued," or "Expires."

In step 930, the images of each field are extracted from the check image. The extracted images may have a larger area than that specified in the configuration file because the handwriting may exceed the boundaries of the field dimension. In step 930, the size of images to be extracted can be adjusted to accommodate different handwriting styles.

In embodiments, the extracted images contain clean images of each field, meaning that the extracted images contain characters or words to be recognized and does not contain layout textures, background pictures, guidelines, and/or noise.

In step 940, the extracted images are segmented into words or characters. In step 950, if the extracted images are segmented into words, the IWR engine recognizes words in the segmented images. Alternatively, if the extracted images are segmented into characters, the OCR engine recognizes characters in the segmented images. In yet another alternative, a portion of the extracted images are segmented into characters and a portion of the extracted images are segmented into words. Finally, in step 960, recognized characters or words are assembled to form the output of each field.

For example, in step 940, the field for the payee's name 550 in FIG. 5 can be segmented into images of the characters "A," "m," "e," "r," "i," "c," "a," "n," "," "E," "x," "p," "r," "e," "s," and "s." Then, in step 950, the characters are recognized, and, in step 960, the recognized character are assembled together to form the output text "American Express."

Alternatively, the extracted field image can be segmented into word images of "American" and "Express," in step 940. In step 950, each word is recognized and, in step 960, recognized words are assembled together to form the text string "American Express." In this manner, the information in a field of the check image is recognized so that it may be provided to a financial institution, which may complete a financial transaction based on the recognized information in the field.

The method of recognizing information in an image of an object may include processing field recognition results with format filters. The format filters filter out candidate recognition results that do not to conform to a predetermined format. The predetermined format may specify a predetermined number of digits and letters. For example, the format filters may include a filter for an account number field. This filter may reject candidate recognition results that do not contain N digits and M letters. As another example, the format filters may include a filter for a date field. This filter may reject all dates outside a predetermined date range from a list of candidate recognition results suggested by the character or word recognition engine.

The method of recognizing information in an image of an object may additionally or alternatively include processing field recognition results with a dictionary. Processing field recognition results with a dictionary may involve applying weights (e.g., weights between 0 and 1) to each of the candidate recognition results obtained by the character or word recognition engine based on words in the dictionary. In some embodiments, if a candidate recognition result matches or closely matches a word in the dictionary, it remains on the list of candidate recognition results. Otherwise, the candidate recognition result is rejected. In other embodiments, scores are given to the candidate recognition results depending upon how closely the candidate recognition results match a word in the dictionary. For example, if the candidate recognition result matches or closely matches a word in the dictionary, it is given a high score. Otherwise, the candidate recognition result is given a low score.

Figure 10:
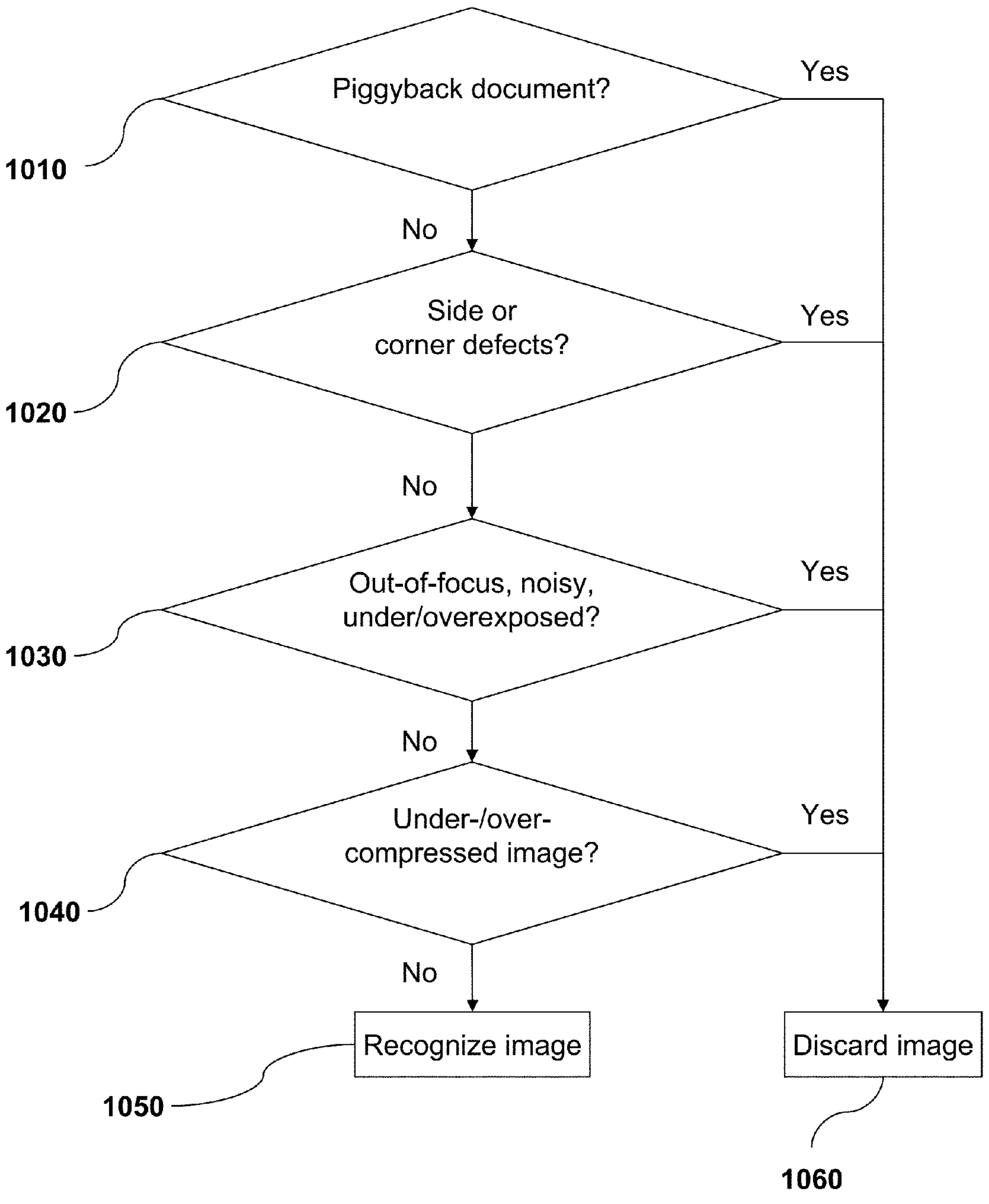
FIG. 10 is a flowchart illustrating a method of determining whether an image of the object is usable and readable in accordance with embodiments of the present disclosure.

FIG. 10 is a flowchart illustrating a method of analyzing the quality of the captured and processed image to determine whether the processed image is recognizable by a character and/or word recognition engine.

The method of analyzing the quality of an object image begins in step 1010. In step 1010, it is determined whether the object image includes a piggyback document, meaning that the object image includes another document on top of and covering at least a portion of the object to be processed. This happens when a document is accidentally captured together with the object from which information is to be extracted. If it is determined that the object image does not include a piggyback document, the method proceeds to step 1020. Otherwise, the object image is discarded in step 1060.

Next, in step 1020, it is determined whether the object image includes side or corner defects. These defects include a folded or torn-off side or corner of the object. If it is determined that the object image does not have such defects, the process proceeds to step 1030. Otherwise, the object image is discarded in step 1060. In other embodiments, even if the corner or side defects are detected, the object image may proceed to step 1030 when the defects do not hinder the object recognition process. This can be done by comparing a measurement of the defects with a predetermined threshold value. When the measured defects are less than the predetermined threshold value, the object image proceeds to the next step 1030.

In step 1030, the quality of the object image is determined. This may be accomplished by determining whether the object image is out-of-focus or noisy (e.g., excessive spots in the object image), or determining whether the object image is underexposed or overexposed. An out-of-focus image appears as an unclear or blurred image, which makes it impractical or impossible to recognize information contained within the object image. Noise appears as dots in the object image. Thus, excessive noise may hinder check recognition even though the object image may be in focus. Also, an underexposed or overexposed object image or an object with non-uniform lighting may also hinder the object recognition process. If the quality of the object image is greater than a predetermined threshold quality, the process proceeds to step 1040. Otherwise, the object image is discarded in step 1060.

Next, in step 1040, it is determined whether the object image is under- or over-compressed. The under-compressed image indicates that the object image is a document with a large amount of white space and a small amount of handwritten or typewritten information. The over-compressed image indicates that the object image has a large amount of information such as a large amount of handwritten information or high-contrast background patterns. If it is determined that the object image has an appropriate compression value, meaning that the compression value is in between a predetermined maximum compression value and a predetermined minimum compression value, the object image proceeds to step 1050. Otherwise, the object image is discarded in step 1060.

The predetermined threshold values may be dependent upon the location of the defects in the object image. The predetermined threshold values may also be dependent upon the type and the location of the field which are specified in a configuration file.

Figure 11:
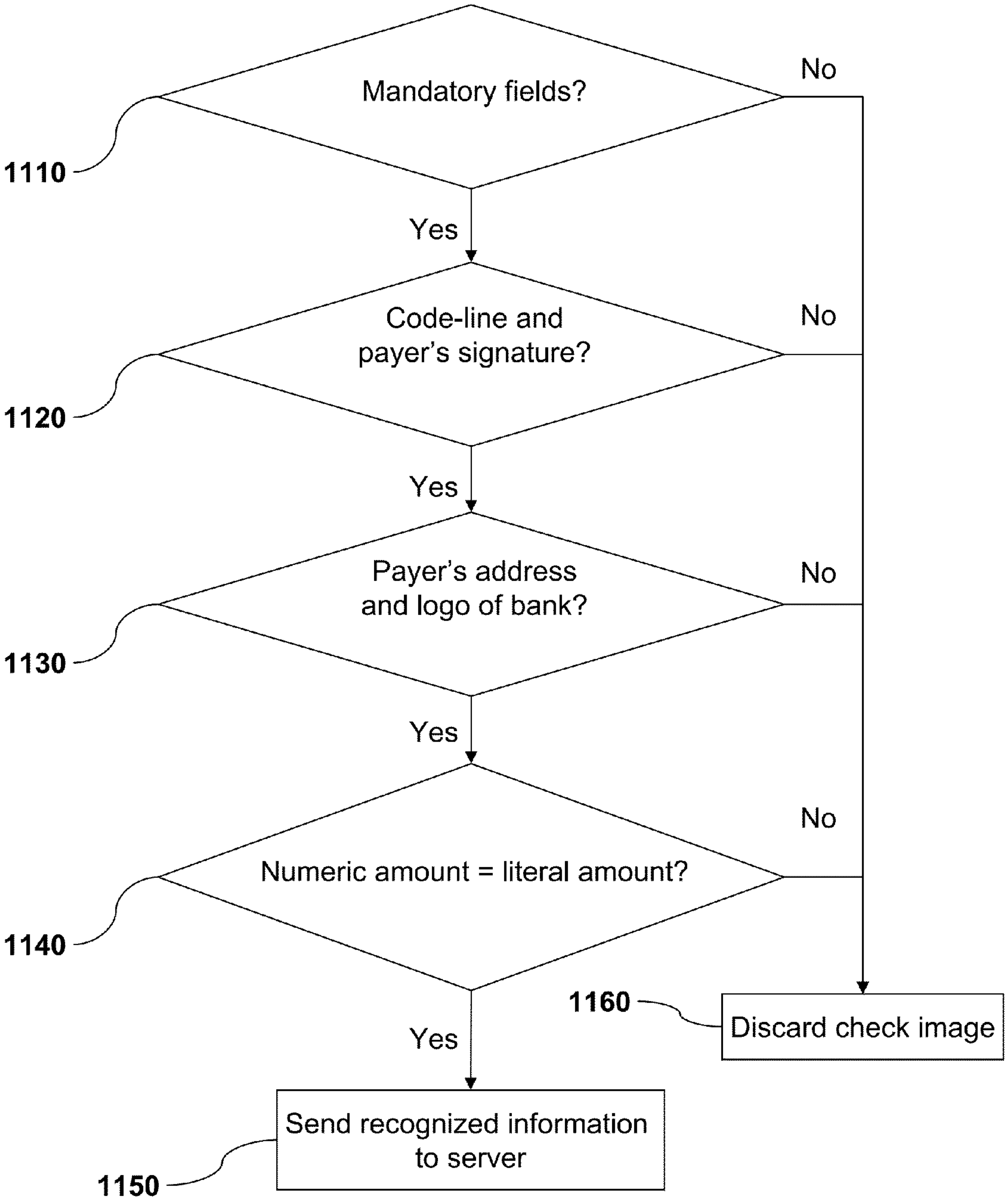
FIG. 11 is a flowchart illustrating the step of determining the validity of the information in the image of the object in FIG. 7.

FIG. 11 is a flowchart illustrating a method of determining the validity of an object, e.g., check images. The method may also be used to determine validity of a credit card and an identification card or document. Unlike the method of FIG. 10, this method is performed after information in the check image is recognized because invalid checks are determined based on the recognized information. In step 1110, it is determined whether the mandatory fields include information. As described above with respect to FIG. 5, the mandatory fields may include the numeric amount, the literal amount, the date of issue, the code-line, and the payee's name. If any one of these mandatory fields is missing information or includes information that cannot be recognized by the word or character recognition engine, the check in the image is regarded as an invalid check and is discarded in step 1160. In other embodiments, in the case where the information cannot be recognized by the word or character recognition engine, the check is not discarded. Instead, a user interface prompts the user to input the information that cannot be recognized by the word or character recognition engine via the user interface.

Next, in step 1120, it is determined whether a code-line and payer's signature are recognized. The code-line is a field for the payer's bank routing and account numbers. When the code-line includes recognized information, it is determined whether the field for the payer's signature includes recognized information. Step 1120 may include the steps of sending the image of the payer's signature field to the payer's bank and receiving a response from the bank indicating whether the image of the payer's signature field is the payer's actual signature. When it is determined that the information within these fields is not missing or that the payer's signature in the signature field is valid, the method proceeds to step 1130. Otherwise, the check image is discarded in step 1160.

Next, in step 1130, the payer's address and the bank logo are verified. Similar to step 1120, step 1130 may also include determining whether the payer's address and the bank logo were correctly recognized. Alternatively, the existence of information in both fields is determined. When it is determined that information is within both fields, the method proceeds to step 1140. Otherwise, the check image is discarded (e.g., deleted from memory) in step 1160.

In step 1140, it is determined whether the numeric amount is equal to the literal amount. If the amounts are equal, then the recognized information and the binarized check image are sent to a server in step 1150. The server may perform financial transactions based on the recognized information. If the numeric and literal amounts are not equal, then the check image is discarded in step 1160. Step 1140 may include three substeps: (1) determine whether the numeric amount is present, (2) determine whether the literal amount is present, and (3) if both of the numeric and literal amounts are present, determine whether they are equal each other. As described with reference to FIG. 6B, this method may include scoring the quality of the recognition of the numeric and literal amounts and cross-correlating the scores.

The description above illustrates the systems and methods of the present disclosure as applied to financial documents. Illustrations of the systems and methods of the present disclosure as applied to credit cards and ID cards are shown in the documents entitled "Sketch of the A2iA Mobile ID Reader" and "Sketch of the A2iA Mobile CardReader" attached to the present disclosure as Appendices. As described above, the systems and methods of the present disclosure can be applied to any type of object to obtain financial and identification information.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:

1. A method for recognizing information in an object using a mobile device, the method comprising:

analyzing images of the object in an image data stream generated by an image capturing device of the mobile device;

capturing a first image from the image data stream;

transforming the first image to obtain a second image;

binarizing the second image to obtain a binarized image;

recognizing information in the binarized image; and determining the validity of the recognized information, wherein determining the validity of the recognized information is selected from the group consisting of detecting the presence of mandatory fields in the binarized image, detecting code-line and payer's signature in the binarized image, detecting payer's address and bank logo in the binarized image, and detecting a difference between a numeric amount and a literal amount based on the recognized information, and wherein detecting a difference includes:

determining a score for recognition of the numeric amount, determining a score for recognition of the literal amount, and determining an overall recognition score by comparing the score for recognition of the numeric amount and the score for recognition of the literal amount.

2. The method according to claim 1, wherein analyzing the image data stream includes locating and tracking a quadrangle of the object in the images of the image data stream.

3. The method according to claim 2, further comprising:

tracing the quadrangle of the object; and displaying the traced quadrangle.

4. The method according to claim 1, wherein transforming the first image includes:

locating a quadrangle of the object in the first image;

transforming the first image so that the quadrangle of the object forms a rectangle, resulting in a second image; and removing portions of the second image that are outside of the quadrangle of the object.

5. The method according to claim 4, wherein transforming the first image includes performing an affine transformation on the first image.

6. The method according to claim 1, wherein transforming the first image includes:

locating a quadrangle of the object in the first image;

removing portions of the first image that are outside of the quadrangle of the object, resulting in a second image; and transforming the second image so that the quadrangle of the object form a rectangle.

7. The method accordingly to claim 1, further comprising:

transforming the second image to obtain uniform brightness over the second image, resulting in a third image; and converting the third image into a binarized image.

8. The method according to claim 1, further comprising performing image quality analysis on the second image to detect image defects in the second image.

9. The method according to claim 8, wherein the image defects include a piggyback document, side or corner defects, out-of-focus, noisiness, overexposed, underexposed, undercompressed, over-compressed, or non-uniform lighting.

10. The method according to claim 1, further comprising transmitting the recognized information and the binarized image to a remote server.

11. The method according to claim 1, wherein recognizing information in the binarized image includes:

reading a configuration file that specifies predetermined field information associated with a type of the object;

locating predetermined fields in the binarized image based on the predetermined field information; and recognizing information in the predetermined fields.

12. The method according to claim 11, wherein locating the predetermined fields in the binarized image includes locating predetermined fields whose positions are described in a configuration file or locating fields by associated keywords or by associated key objects.

13. The method according to claim 1, wherein recognizing information in the binarized image includes:

obtaining predetermined field information associated with a type of the object through a user interface;

locating predetermined fields in the binarized image based on the predetermined field information; and recognizing information in the predetermined fields.

14. The method according to claim 13, wherein the predetermined fields include at least one of literal amount, numeric amount, date of issue, payer's signature, payer's name and address, payer account, payee name, bank logo, object number, code line, check number, and memo line.

15. The method according to claim 1, further comprising:

determining whether the captured first image is a color image or a grayscale image; and converting the captured first image into a grayscale image if it is determined that the captured first image is a color image.

16. The method according to claim 1, wherein the mandatory fields include the numeric amount, the literal amount, the date of issue, and the payee's name.

17. The method according to claim 1, wherein the object is selected from the group consisting of a financial document, a debit card, a credit card, a gift card, a document issued by a bank or a payment system, an identification (ID) document, an ID card, a driver license, a passport, and an identifying document issued by a country or an organization.

18. A mobile device for processing an image of an object and recognizing information in the processed image of the object, the mobile device comprising:

an image capturing device configured to generate an image data stream of images of the object and to capture a first image of the object;

a memory coupled to the image capturing device and configured to store the captured first image;

a display unit coupled to the image capturing device and configured to display the image data stream and the captured first image; and a processor coupled to the memory and the display unit, the processor configured to analyze images of the object in the image data stream prior to capturing the first image, to transform the first image to obtain a second image, to binarize the second image to obtain a binarized image, to recognize information in the binarized image, and to determine the validity of the recognized information, wherein the processor determines the validity of the recognized information by performing a function selected from the group consisting of detecting the presence of mandatory fields in the binarized image, detecting code-line and payer's signature in the binarized image, detecting payer's address and bank logo in the binarized image, and detecting a difference between a numeric amount and a literal amount based on the recognized information, and wherein detecting a difference includes:

determining a score for recognition of the numeric amount, determining a score for recognition of the literal amount, and determining an overall recognition score by comparing the score for recognition of the numeric amount and the score for recognition of the literal amount.

19. The mobile device according to claim 18, wherein the processor analyzes images of the object in the image data stream by locating and tracking a quadrangle of the object in the images of the image data stream.

20. The mobile device according to claim 19, wherein the processor is further configured to trace the quadrangle of the object, and wherein the display unit is further configured to display the traced quadrangle.

21. The mobile device according to claim 18, wherein the processor is configured to:

analyze the first image by locating a quadrangle of the object in the first image, convert the first image by transforming the first image so that the quadrangle of the object forms a rectangle, resulting in a second image, and remove portions of the second image that are outside of the quadrangle of the object.

22. The mobile device according to claim 18, wherein the display unit displays a user interface requesting that the user input information that the processor cannot properly recognize.

23. The mobile device according to claim 18, wherein the image capturing device is a mobile camera built into the mobile device or an external image capturing device in communication with the mobile device.

24. A mobile device for remotely recognizing information in an object, the mobile device comprising:

an image capturing device configured to generate an image data stream of images of the object and to capture a first image from the image data stream;

a memory coupled to the image capturing device and configured to store the first image;

a display unit coupled to the image capturing device and configured to display the image data stream and the first image;

a processor coupled to the memory and the display unit, the processor configured to analyze images of the object in the image data stream prior to capturing the first image, to normalize the first image to obtain a normalized image, to binarize the normalized image, to recognize information in the binarized image, and to determine the validity of the recognized information; and a communication unit coupled to the processor and the memory, the communication unit configured to transmit the binarized image and the recognized information to a server of a financial institution to further process the binarized image and the recognized information, wherein the processor determines the validity of the recognized information by performing a function selected from the group consisting of detecting the presence of mandatory fields in the binarized image, detecting codeline and payer's signature in the binarized image, detecting payer's address and bank logo in the binarized image, and detecting a difference between a numeric amount and a literal amount based on the recognized information, and wherein detecting a difference includes:

determining a score for recognition of the numeric amount, determining a score for recognition of the literal amount, and determining an overall recognition score by comparing the score for recognition of the numeric amount and the score for recognition of the literal amount.

25. The mobile device according to claim 19, wherein the object is selected from the group consisting of a financial document, a credit card, a debit card, a check card, a gift card, an identification card, and an identification document.

* * * * *